Jan. 3, 1928. 1,655,104

E. G. OAKLEY

BRIDGE WASHER AND NUT FOR TIRE VALVES

Filed Dec. 28, 1923 2 Sheets-Sheet 1

Inventor
Erastus G. Oakley
By Henry E. Rockwell
Attorney

Jan. 3, 1928.　　　　　　　　　　　　　　　1,655,104
E. G. OAKLEY
BRIDGE WASHER AND NUT FOR TIRE VALVES
Filed Dec. 28, 1923　　　　2 Sheets-Sheet 2

Inventor
Erastus G. Oakley
By Henry E. Rockwell
Attorney

Patented Jan. 3, 1928.

1,655,104

UNITED STATES PATENT OFFICE.

ERASTUS G. OAKLEY, OF SOUTHPORT, CONNECTICUT, ASSIGNOR TO BRIDGEPORT BRASS COMPANY, OF BRIDGEPORT, CONNECTICUT.

BRIDGE WASHER AND NUT FOR TIRE VALVES.

Application filed December 28, 1923. Serial No. 683,196.

This invention relates to bridge washers for tire valves and more particularly to a combined bridge washer and clamping nut secured together so that they may be applied to the valve stem as a unitary structure. Moreover, it is also proposed to secure what is usually termed a ring washer to the opposite side of the bridge washer from the nut so that all three of these elements will be united and assembled upon the valve stem in one operation.

Inner tubes of pneumatic tires in use at the present time, are commonly provided with what is termed a valve stem, in the form of a shell or housing in which the valve proper or valve "inside" is mounted. This valve stem is provided with a head or flange upon its inner end, which is forced through an opening in the tube, the tube wall about such opening being then clamped between the head of the stem and a ring washer positioned upon the stem. To draw or urge these two elements into close contact with the tube wall, a clamping nut is usually threaded upon the valve stem and by screwing down the nut the ring washer is forced against the wall of the tube, which is in turn clamped tightly against the head of the stem.

It is also necessary to provide some means of securing the outer casing or tire "shoe" to the wheel rim and for this purpose a bridge washer is usually mounted upon the stem between the ring washer and the clamping nut, the bridge washer usually comprising a somewhat elongated member provided with end flanges which are turned or bent downwardly in a direction away from the ring washer. It will be obvious that if these parts are combined into a unitary structure, the assembly of these parts upon the valve stem may be facilitated and also any likelihood of one or another of the parts being omitted when the parts are assembled, will be obviated.

One object of my invention is to provide a combined bridge washer and clamping nut.

Another object of my invention is to connect the clamping nut to the bridge washer in such a manner that the nut will be permitted to rotate on the bridge washer so that it may be threaded upon the stem without requiring the rotation of the washer.

A still further object of my invention is to provide a combined bridge washer, ring washer and clamping nut in a unitary structure which may be applied to the valve stem in a single operation, and which may be economically manufactured.

Still another object of my invention is the provision of an improved means of connecting the clamping nut to the ring washer of a tire valve stem.

To these and other ends, the invention consists in the novel features and combinations of parts to be hereinafter described and claimed.

In the accompanying drawings:

Fig. 16 is a bottom plan view of the bridge washer prior to the application of the clamping nut, and.

Figure 1:
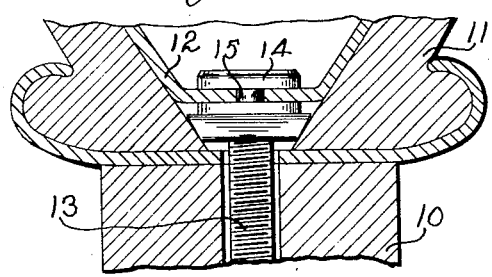
Fig. 1 is a sectional view of a wheel rim having mounted thereon a tire provided with a valve stem and associated parts embodying my improvements.
Figure 2:
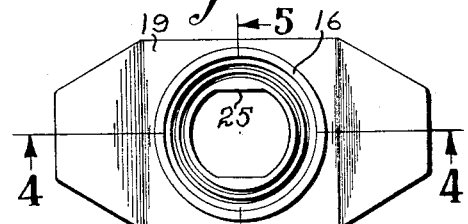
Fig. 2 is a top plan view of the combined bridge washer and clamping nut.
Figure 6:
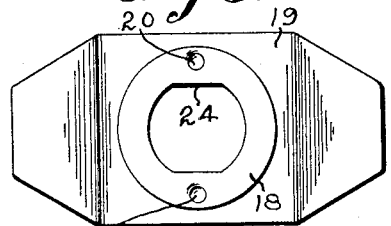
Fig. 6 is a top plan view of the bridge washer prior to the application of the ring washer.
Figure 3:
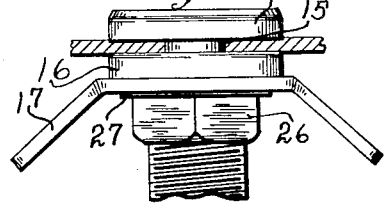
Fig. 3 is a side elevational view of a valve stem and the associated parts.
Figure 7:
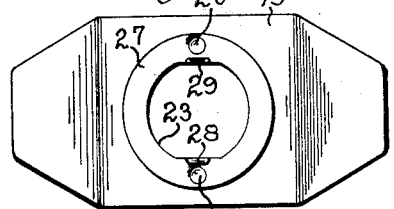
Fig. 7 is a bottom plan view of the bridge washer prior to the application of the clamping nut.
Figure 4:
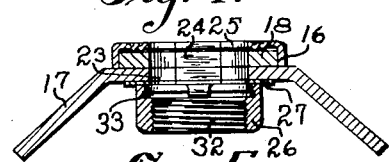
Fig. 4 is a sectional view on line 4—4 of Fig. 2.
Figure 5:
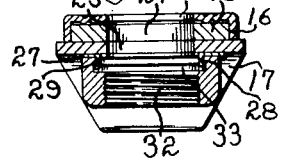
Fig. 5 is a sectional view on line 5—5 of Fig. 2.

In Fig. 1 of the drawings I have shown in a fragmentary way, a wheel rim at 10, upon which is mounted a tire casing or shoe 11, containing the usual inner tube 12. The valve stem 13 is provided with a head or base 14 upon its inner end, which is inserted through an opening 15 in the tube.

The wall of the inner tube is clamped between the head 14 of the valve stem and a so-called ring washer 16, mounted upon the stem. Although not essential to all aspects of the invention, I prefer to secure the ring washer to the bridge washer 17 so as to facilitate the assembly of the parts and to this end I secure an auxiliary washer 18 upon the upper flat surface 19 of the bridge washer. The washer 17 may be secured in place by any desired means, preferably, however, by spot welding, as shown at 20 and 21. The ring washer 16 is usually circular in shape and according to the present invention is provided with a peripheral flange 22, which frictionally grips the periphery of the auxiliary washer 18, when the ring washer is pressed down thereupon. The usual noncircular openings 23, 24 and 25 are provided in the three washers referred to, the shape of these openings corresponding to the cross sectional shape of the valve stem 13.

It is necessary that the ring washer be forced down tightly against the tube wall so that the latter may be clamped between the head 14 and this washer to make an air tight connection with the tube. It is usual to provide a separate nut threaded upon the valve stem 13 for clamping the parts together.

In my present construction, however, I secure this nut 26 to the bridge washer and ring washer so that while the nut is free to rotate so that it may be threaded upon the stem, it is secured against separation from the other parts so that all may be applied or placed upon the valve stem as a unit.

Figure 8:
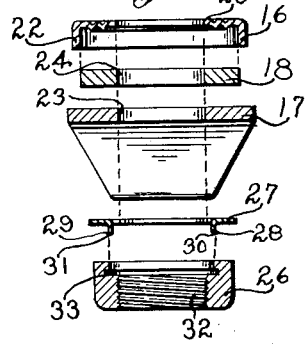
Fig. 8 is a composite sectional view showing the various parts of the combined structure prior to the assembly thereof.

I have shown in Fig. 8 an expedient method of connecting the nut to the washer, which is accomplished by first securing to the bridge washer, an annulus or auxiliary washer 27, which like the auxiliary washer 18 may be spot welded to the bridge washer. As shown in Fig. 8, it is placed upon the opposite side of the bridge washer from that upon which the washer 18 is disposed. The washer 27 is preferably made of relatively thin metal so that a pair of spring tongues 28 and 29, having slightly bent-over or out-turned ends 30 and 31 may be struck up. The nut is provided (as shown in Fig. 8) above its threaded bore 32 with an annular recess 33. Preferably the spring tongues 28 and 29 are of such thickness and resiliency that the nut may be slipped over these tongues, the bent ends 30 and 31 then springing outwardly into the annular channel 33 so that the nut may be permitted a free rotative movement relatively to the bridge washer. It will be apparent that I have connected the bridge washer and nut together so that they may be assembled upon the valve stem in a more expedient manner than heretofore, while at the same time the desired relative movements between these parts is not interfered with. Likewise, I have also combined the ring washer, bridge washer and nut into a unitary structure so that all three may be applied to the valve stem as one element.

Figure 9:
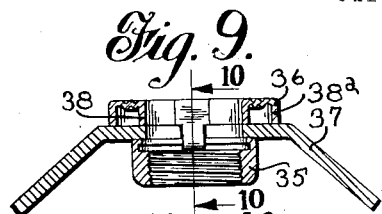
Fig. 9 is a longitudinal sectional view of a bridge washer and clamping nut of modified construction.
Figure 10:
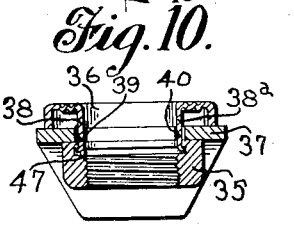
Fig. 10 is a transverse sectional view on line 10—10 of Fig. 9.
Figure 11:
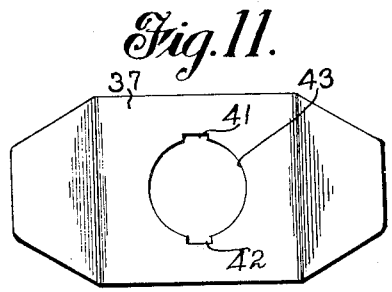
Fig. 11 is a top plan view of the bridge washer shown in Fig. 9.
Figure 12:
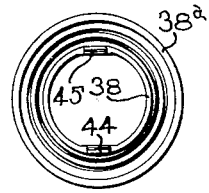
Fig. 12 is a bottom plan view of the ring washer.
Figure 13:
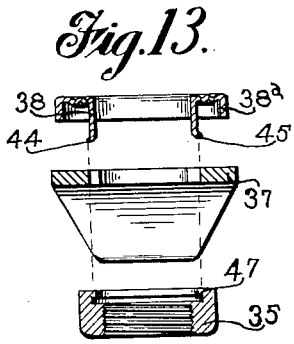
Fig. 13 is a composite sectional view showing the several parts of the combined bridge washer and clamping nut shown in Fig. 9, prior to their assembly.
Figure 14:
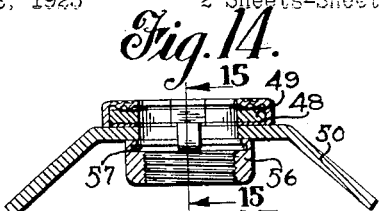
Fig. 14 is a view similar to Fig. 9 of a further modification.
Figure 15:
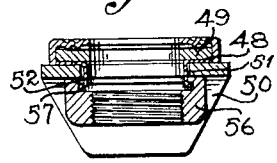
Fig. 15 is a sectional view on line 15—15 of Fig. 14.
Figure 16:
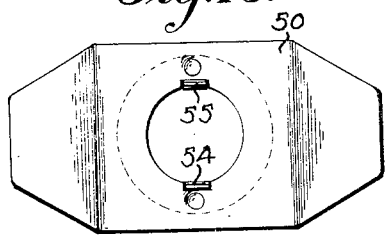
Figure 17:
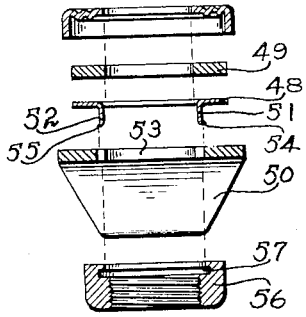
Fig. 17 is a composite sectional view showing the various elements contained in the structure shown in Fig. 14.

In Fig. 9, I have shown a modified form of construction wherein I connect the clamping nut 35 to the ring washer 37 between these parts, I am enabled to dispense with the auxiliary washers shown in connection with the device illustrated in Figs. 1 to 8. The ring washer 36 is formed, in this instance, with both outer and inner peripheral flanges 38 and 38$^a$, which rest upon the upper surface of the bridge washer so as to space the ring washer a sufficient distance therefrom. Tongues 39 and 40 depend from the inner peripheral flange 38 and pass through diametrically spaced notches 41 and 42 in the periphery of the opening 43 in the bridge washer. The opening in the bridge washer is circular in shape in this instance, except at the points where these notches occur, the tongues 39 and 40 forming the flat sides of the opening to prevent rotation of the bridge washer upon the stem. The tongues 39 and 40 extend through the opening 43 in the bridge washer and at their free ends are turned outwardly, as shown at 44 and 45. The nut 35, formed similarly to the nut 26, heretofore described, may then be slipped upon these tongues which are sufficiently resilient that the out-turned ends will spring into the annular recess 47 of the nut. The ring washer is formed of sufficiently thin material that the tongues 39 and 40 may be formed integrally therewith and be sufficiently resilient to function satisfactorily in securing the nut to the washer. By disposing the bridge washer between the ring washer and nut, the three parts are effectually held together and may be applied to the valve stem as a unit, while at the same time the bridge and ring washers are held against rotation relatively to each other and to the valve stem and the nut is permitted to have a free rotative movement.

In Figs. 14 to 17 I have shown a further modification somewhat similar to the preferred form of my invention shown in Figs. 1 to 8, but differing therefrom in that the two auxiliary washers 48 and 49 are both mounted upon the upper side of the bridge washer 50, the tongues 51 and 52 of the washer 48 extending through peripheral notches in the opening 53 in the bridge washer. The tongues 51 and 52 are slightly longer than those of the washer 27 secured to the lower surface of the bridge washer 17 so that they may pass through the opening in the bridge washer and receive upon their out-turned ends 54 and 55, the clamping nut 56, these ends springing into the annular recess 57.

In practice, it is found that the clamping nut may be secured in place and removed quite readily, this being ordinarily accomplished without the aid of any tool, merely by the fingers, while at the same time the clamping nut will be held to the remaining parts with sufficient security in actual use. As both the ring washer and the bridge washer are clamped tightly between the head 14 and the clamping nut there will be no strain tending to separate the clamping nut from the rest of the structure, the advantage in combining the parts into a unitary structure being principally in the greater facility with which the parts may be handled and assembled upon the stem prior to their actual use. While I have shown and described some preferred embodiments of my invention, it will be understood that it is not to be limited to all the details shown, but is capable of further modification and variation within the spirit of the invention and within the scope of the appended claims.

I do not claim broadly herein the combination of a bridge washer plate, a separate annulus applied to the upper surface thereof by suitable means such as spot welding, and a liner or cover for the annulus of non-oxidizing metal frictionally connected with the annulus at the periphery of the liner, as claimed in my application Serial No. 683,197, filed December 28, 1923.

What I claim is:

1. In combination, a bridge washer, a clamping nut swivelled thereto, one of said parts being provided with a recess and the other being provided with projecting resilient tongues entering said recess.

2. In combination, a bridge washer and a nut having an annular disk of resilient material rotatably connected thereto, said disk being secured to said washer, said nut being provided with a groove and said disk having resilient tongues received within said groove.

In witness whereof, I have hereunto set my hand this 20 day of December, 1923.

ERASTUS G. OAKLEY.